US012595748B1

United States Patent
Schneider et al.

(10) Patent No.: US 12,595,748 B1
(45) Date of Patent: Apr. 7, 2026

(54) NON-STRUCTURAL PLIES AT SEAL FOR COOLING AIR AND METHOD THEREOF

(71) Applicant: RTX CORPORATION, Farmington, CT (US)

(72) Inventors: Alex J. Schneider, Manchester, CT (US); Winston Smiddy, South Windsor, CT (US); Peter Wilkins, Manchester, CT (US); Paul M. Lutjen, Kennebunkport, ME (US); Scot M. Surprenant, Wells, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/905,689

(22) Filed: Oct. 3, 2024

(51) Int. Cl.
*F01D 25/12* (2006.01)
*F01D 11/00* (2006.01)

(52) U.S. Cl.
CPC ............ *F01D 25/12* (2013.01); *F01D 11/003* (2013.01); *F05D 2240/55* (2013.01); *F05D 2300/6033* (2013.01)

(58) Field of Classification Search
CPC ...... F01D 11/003; F01D 11/005; F01D 25/12; F05D 2240/55; F05D 2300/6033
See application file for complete search history.

(56) References Cited

U.S. PATENT DOCUMENTS 10,648,407 B2 * 5/2020 Blaney ...................... F02C 3/04
10,920,600 B2 * 2/2021 Blaney .................. F01D 25/246
11,041,399 B2 * 6/2021 Lutjen ....................... F01D 5/14
11,174,795 B2 * 11/2021 Lutjen ................... F01D 11/005
11,215,119 B2 * 1/2022 Blaney .................. F01D 11/003
11,643,948 B2 5/2023 Clark et al.
11,680,488 B2 6/2023 Dyson et al.
11,746,669 B1 * 9/2023 Romanov ............... F01D 25/08 415/170.1
2008/0199661 A1 8/2008 Keller et al.
2020/0072071 A1 * 3/2020 Blaney .................. F01D 11/005
2020/0072127 A1 * 3/2020 Blaney .................. F01D 11/005
2020/0255345 A1 * 8/2020 Clark ...................... C04B 35/80
2020/0378306 A1 * 12/2020 Blaney .................... F01D 25/12
2021/0131299 A1 * 5/2021 Lutjen .................. F01D 11/08
2021/0156311 A1 * 5/2021 Lutjen .................. F01D 11/005

* cited by examiner

*Primary Examiner* — Nicholas L Foster
(74) *Attorney, Agent, or Firm* — Christopher B. Kilner; MILLEN, WHITE, ZELANO & BRANIGAN

(57) ABSTRACT

The incorporation of non-structural ceramic plies to a CMC component or preform is used to provide one or more passages allows for cooling air to pass between segregated cooling cavities. In various embodiments, this may include preforming additional layers of non-structural plies to allow for machining of one or more metered passages, or the incorporation of a pre-formed passage or passages into non-structural ply layups. The one or more passages may be machined and/or preformed and may include cylindrical, racetrack, slot, conical or similar geometries. The one or more passage may be used to pass cooling air between cavities separated by sealing features (W-seal, feather seal, etc.). Bypassing discrete sealing features is beneficial to control and/or meter cooling air flow between high-pressure and lower-pressure cavities.

20 Claims, 6 Drawing Sheets

NON-STRUCTURAL PLIES AT SEAL FOR COOLING AIR AND METHOD THEREOF

FIELD OF THE INVENTION

The subject matter disclosed herein relates to cooling of ceramic matrix composite (CMC) turbine engine components and, in particular, to the use of non-structural plies to provide a passage for cooling air through an interface of a seal.

BACKGROUND OF THE INVENTION

Various turbine engine components such as hot section gas path components (e.g., vanes, blades, and/or blade outer air seals (BOAS)) often require internal cooling air flow to achieve target temperatures and component lifespan. Due to engine/system constraints, the cooling air within these components may be split into multiple, segregated cavities such that cooling air may be provided from multiple locations with varying pressure. Due to such constraints, cooling air flow between these cavities may be sealed from each other or may otherwise have communication features of a known size to meter the cooling air flow. In some instances, flow between cavities isolated by intentional sealing features must be introduced. In ceramic matrix composite (CMC) applications, these communication features require specific consideration to be manufactured and utilized effectively.

The above information disclosed in this Background section is only for understanding of the background of the inventive concepts and, therefore, it may contain information that does not constitute prior art.

SUMMARY OF THE INVENTION

The present disclosure is directed, in a first aspect, to a system for providing cooling air to a ceramic matrix composite (CMC) component. The system includes a plurality of structural plies forming a first preform of the CMC component, and a plurality of non-structural plies forming a second preform, the second preform attached to the first preform at a predefined seal location, wherein the plurality of non-structural plies includes at least one passage for cooling air.

In an embodiment of the system, the plurality of non-structural plies may have the at least one passage preformed into the plurality of non-structural plies prior to densification of the CMC component.

In another embodiment of the system, the plurality of non-structural plies may have the at least one passage machined into the plurality of non-structural plies after densification of the CMC component.

In a further embodiment of the system, the at least one passage may include a plurality of passages spaced apart from each other.

In yet another embodiment of the system, the at least one passage may include a geometry selected from the group consisting of a cylindrical shape, a racetrack shape, a slot shape, a conical shape, and combinations thereof.

In an embodiment of the system, the at least one passage may include an environmental barrier coating (EBC) or a machinable coating.

In another embodiment of the system, the at least one passage may be configured to meter air flow from a high-pressure cavity to a lower-pressure cavity.

The present disclosure is also directed, in a second aspect, to a method for providing at least one passage for cooling air past a seal for a ceramic matrix composite (CMC) component. The method includes forming a first preform of the CMC component with a plurality of structural plies, forming a second preform with a plurality of non-structural plies, attaching the second preform to the first preform at a predefined location of the seal, and providing the at least one passage for cooling air through the plurality of non-structural plies.

In an embodiment of the method, providing the at least one passage for cooling air through the plurality of non-structural plies may include preforming the at least one passage into the plurality of non-structural plies prior to densification of the CMC component.

In another embodiment of the method, providing the at least one passage for cooling air through the plurality of non-structural plies may include machining the at least one passage into the plurality of non-structural plies after densification of the CMC component.

In a further embodiment of the method, providing the at least one passage for cooling air through the plurality of non-structural plies may include providing a plurality of passages spaced apart from each other.

In yet another embodiment of the method, providing the at least one passage for cooling air through the plurality of non-structural plies may include providing a geometry selected from the group consisting of a cylindrical shape, a racetrack shape, a slot shape, a conical shape, and combinations thereof.

In an embodiment, the method may further include applying an environmental barrier coating (EBC) or a machinable coating to the at least one passage.

The present disclosure is further directed, in a third aspect, to a method for providing cooling air past a seal to a ceramic matrix composite (CMC) component. The method includes providing a CMC component formed of a plurality of structural plies, providing a plurality of non-structural plies to the CMC component at a predefined location of the seal, wherein the plurality of non-structural plies includes at least one passage for cooling air, sealing a high-pressure cooling air cavity from a lower-pressure cooling air cavity by contact of the seal against the plurality of non-structural plies, and metering cooling air through the at least one passage from the high-pressure cooling air cavity to the lower-pressure cooling air cavity.

In an embodiment of the method, the at least one passage for cooling air may be provided through the plurality of non-structural plies by preforming the at least one passage into the plurality of non-structural plies prior to densification of the CMC component.

In another embodiment of the method, the at least one passage for cooling air is provided through the plurality of non-structural plies by machining the at least one passage into the plurality of non-structural plies after densification of the CMC component.

In a further embodiment of the method, the at least one passage for cooling air may include a plurality of passages spaced apart from each other.

In yet another embodiment of the method, the sealing may be provided by a W-seal.

In an embodiment of the method, the sealing may be provided by a feather seal.

In another embodiment of the method, a flow of the cooling air metered through the at least one passage may be smoothed via an environmental barrier coating (EBC) or a machinable coating applied to the at least one passage.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
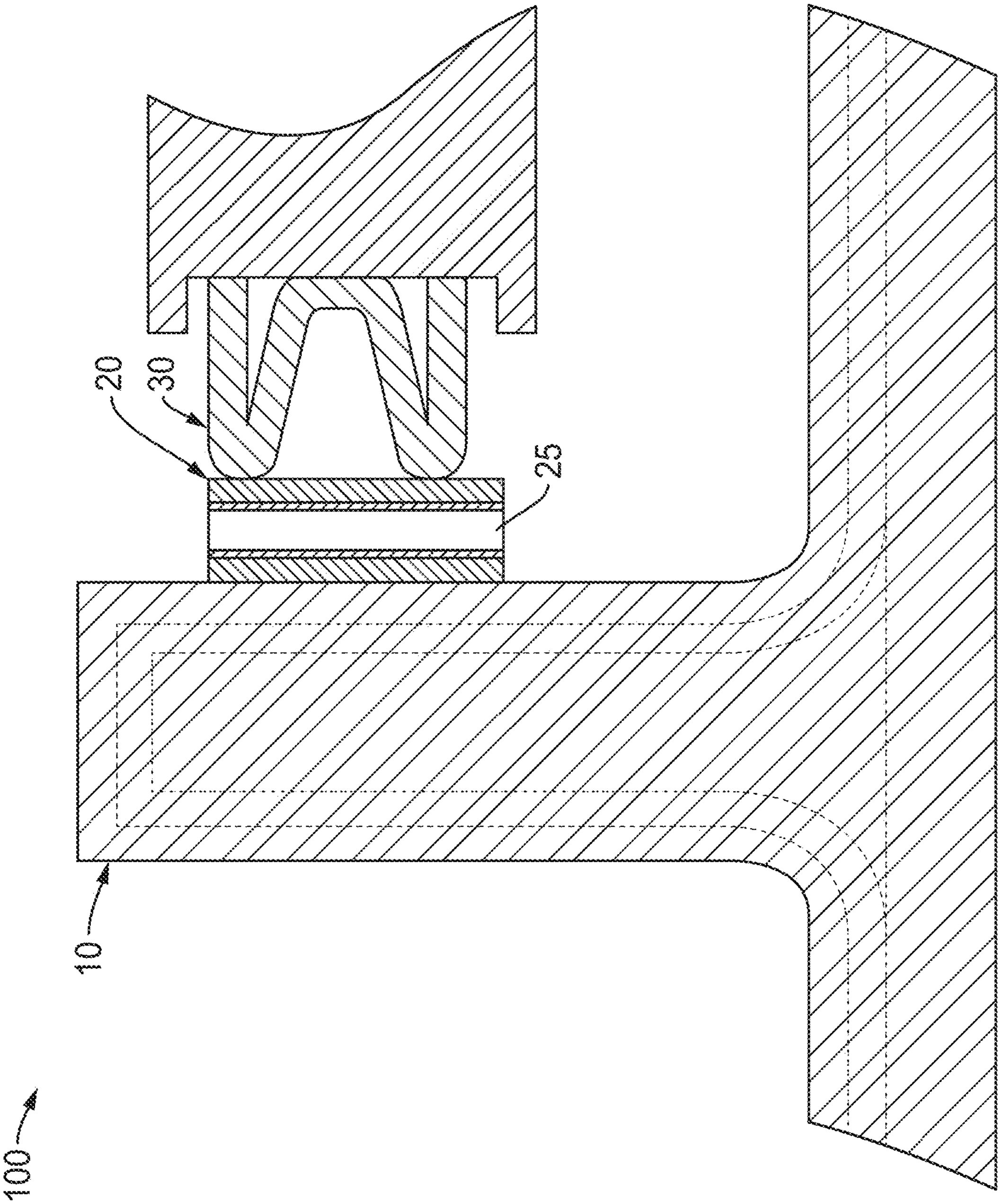
FIG. 1 is cross-section view of a CMC component incorporating non-structural plies to form a leakage path past a seal in accordance with the present disclosure.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to the incorporation of non-structural ceramic plies to a CMC component or preform to provide one or more passages for cooling air to pass between segregated cooling cavities. In various embodiments, this may include preforming additional layers of non-structural plies to allow for machining of one or more metered passages, or the incorporation of a pre-formed passage or passages into non-structural ply layups. The one or more passages may be machined and/or preformed and may include cylindrical, racetrack, slot, conical or similar geometries. The one or more passage may be used to pass cooling air between cavities separated by sealing features (W-seal, feather seal etc.). Bypassing discrete sealing features is beneficial to control and/or meter cooling air flow between high-pressure and lower-pressure cavities. Embodiments in accordance with the present disclosure allow for control of distribution of cooling air to regions of the CMC component which require cooling but would cause significant leakage if cooling air flow were permitted without metering.

Referring to FIG. 1, a system 100 for providing cooling air to a ceramic matrix composite (CMC) component 10 is illustrated. The CMC component 10 may have a plurality of structural plies forming a first preform of the CMC component 10. The CMC component 10 may be a gas turbine engine component such as hot section gas path component, which includes vanes, blades, and BOAS.

The system 100 further includes a second preform or portion formed of a plurality of non-structural plies 20. The non-structural plies 20 of the second preform are attached to the first preform of CMC component 10 at a predefined seal location, where a seal 30 is configured to be disposed substantially adjacent CMC component 10. As discussed further below, the plurality of non-structural plies 20 includes at least one passage 25 for cooling air.

In one or more embodiments, the plurality of non-structural plies 20 may have the at least one passage 25 preformed into the plurality of non-structural plies 20 prior to densification of the CMC component 10. For example, the layup of the non-structural plies 20 may include cuts and plies that provide the one or more passages 25 into the second preform.

In one or more other embodiments, the plurality of non-structural plies 20 may have the at least one passage 25 machined into the plurality of non-structural plies 20 after densification of the CMC component 10. For example, the layup of the non-structural plies 20 may include plies that build up a space for one or more passages 25, and after densification, the one or more passages 25 are machined into the plurality of non-structural plies 20 using any known CMC machining technique, including but not limited to use of lasers, waterjet guided lasers, ultrasonic cutting, and rotating machine tools such as drill bits and end mills.

Although not shown in FIG. 1, FIGS. 3A, 3B, 4A, and 4B illustrate embodiments wherein the at least one passage 25 comprises a plurality of passages 251 or 252 that are spaced apart from each other. The at least one passage 25, 251, 252 may include any suitable geometry, including but not limited to a geometry selected from the group consisting of a cylindrical shape (see FIGS. 3A and 3B), a racetrack shape (see FIGS. 4A and 4B), a slot shape, a conical shape, and combinations thereof. The shape and size of the at least one passage 25 may be varied and selected to address the cooling requirements of the CMC component 10, and in one or more embodiments, may include changes to the metering ability of the passage(s) 25 during the lifetime of the CMC component 10, such as by the removal or addition of material to the passage(s) 25.

In one or more embodiments, the at least one passage 25 may include a coating on an interior surface of the passage 25 to improve air flow characteristics or prevent deterioration of the passage(s) 25. For example, an interior surface of passage(s) 25 may include an environmental barrier coating (EBC) or a machinable coating, each of which may permit the interior surface to be smooth for improved air flow and/or may protect the passage(s) 25 from adverse environmental effects.

Figure 2:
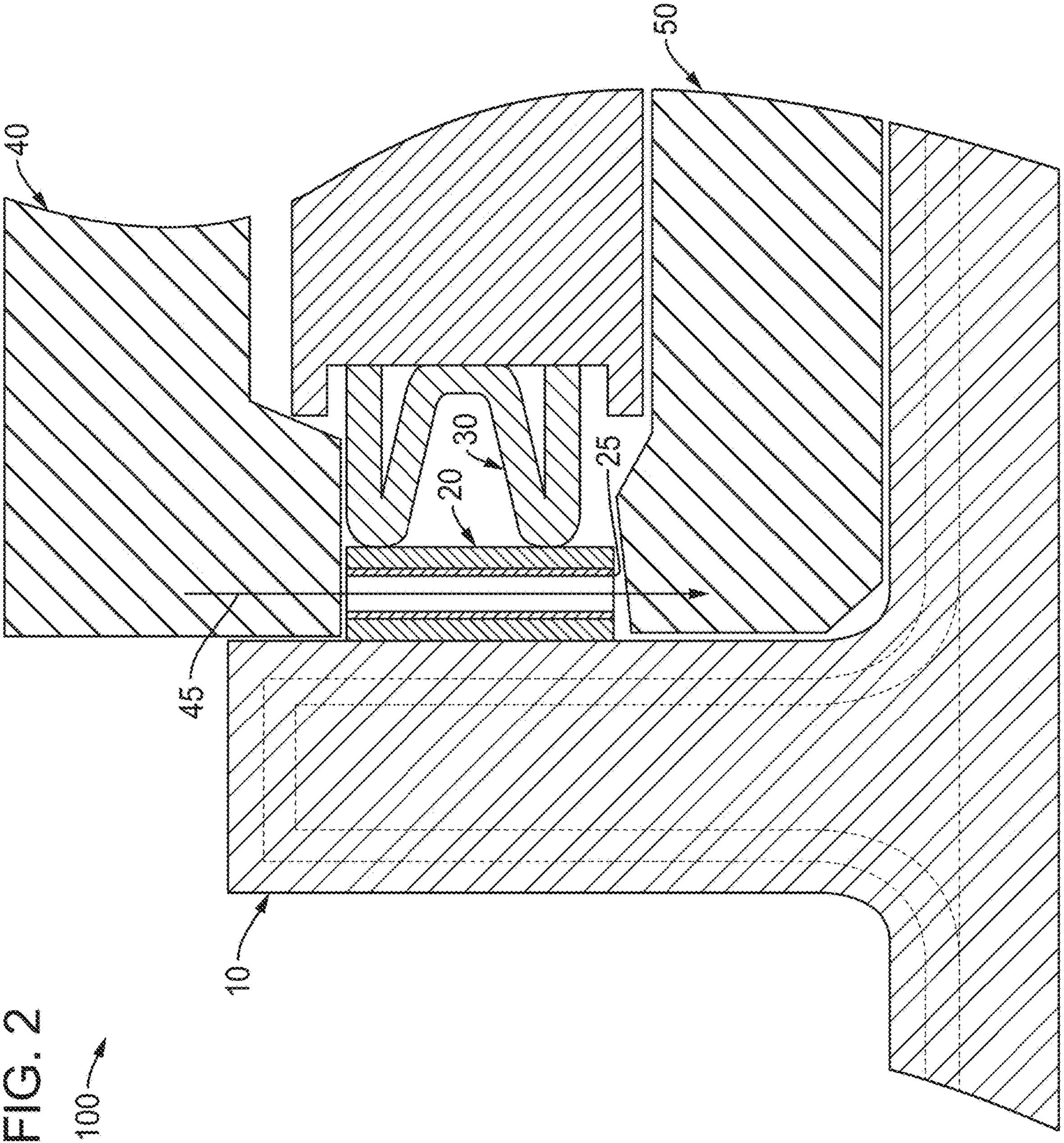
FIG. 2 is cross-section view of a system for providing cooling air between sealed cavities in accordance with the present disclosure.

With reference to FIG. 2, the at least one passage 25 through the non-structural plies 20 may be configured to meter cooling airflow 45 from a high-pressure cavity 40 to a lower-pressure cavity 50 that are separated by seal 30. In such a manner, cooling air flow 45 may be distributed to the CMC component 10 in accordance with the engine and/or system constraints without undue leakage.

Figure 3B:
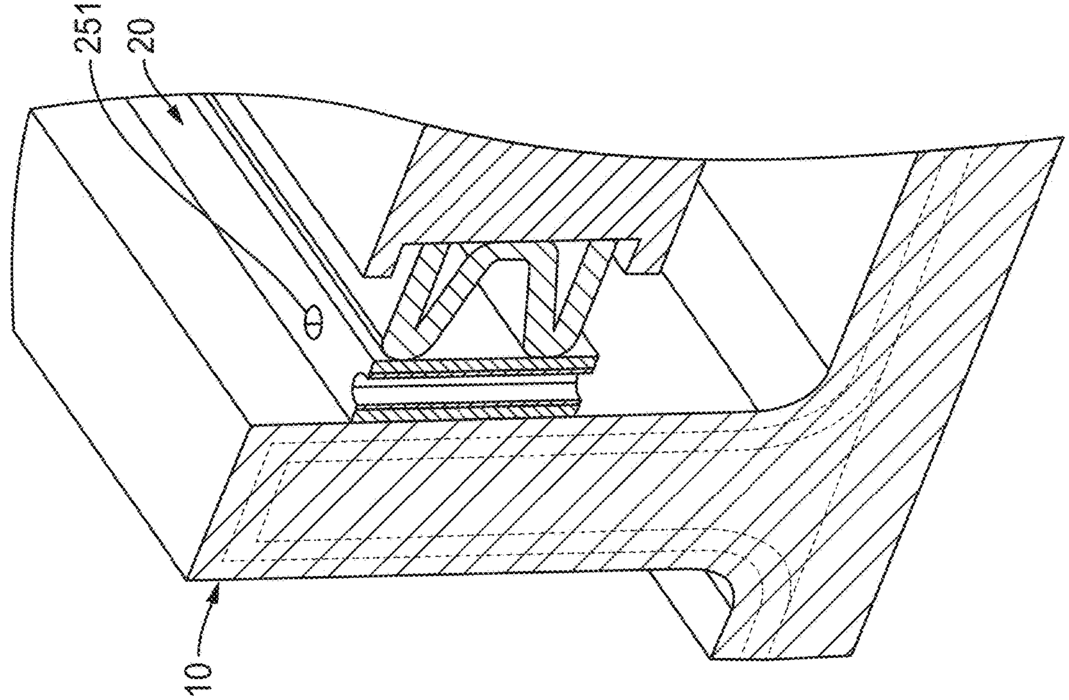
FIGS. 3A and 3B are perspective views of an embodiment having machined passages through the non-structural plies in accordance with the present disclosure.
Figure 3A:
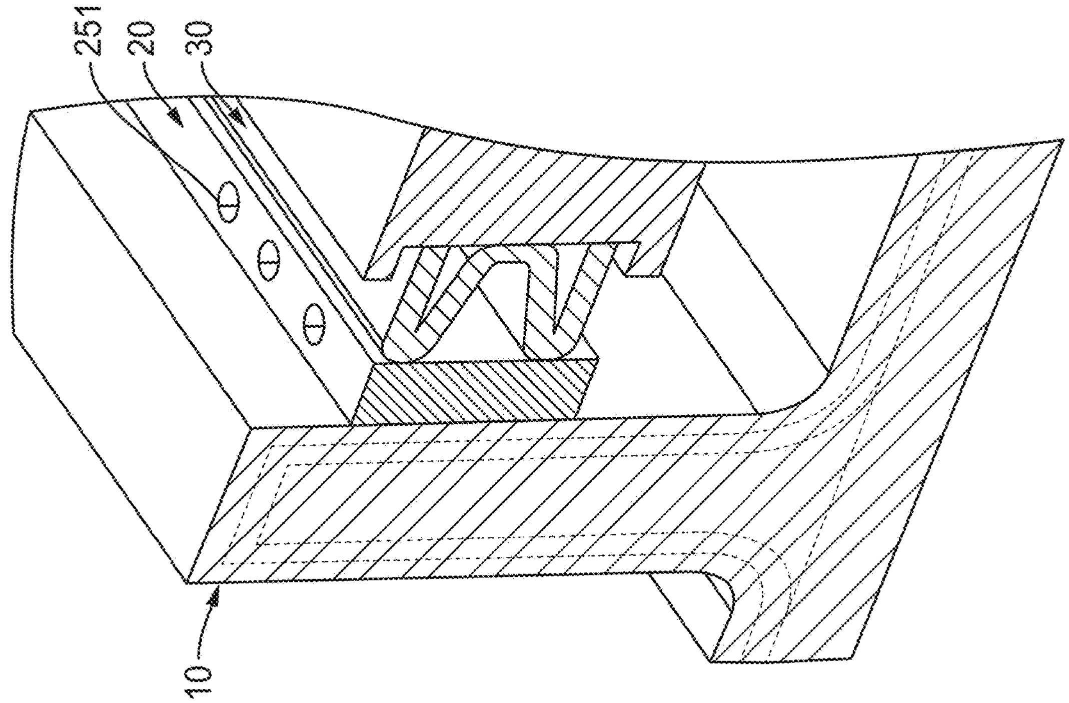

FIGS. 3A and 3B illustrate an embodiment wherein the plurality of non-structural plies 20 have a plurality of cylindrical passages 251 machined into the plurality of non-structural plies 20 after densification of the CMC component 10, with the sectional view of FIG. 3B showing the internal surface of the cylindrical passage 251.

Figure 4B:
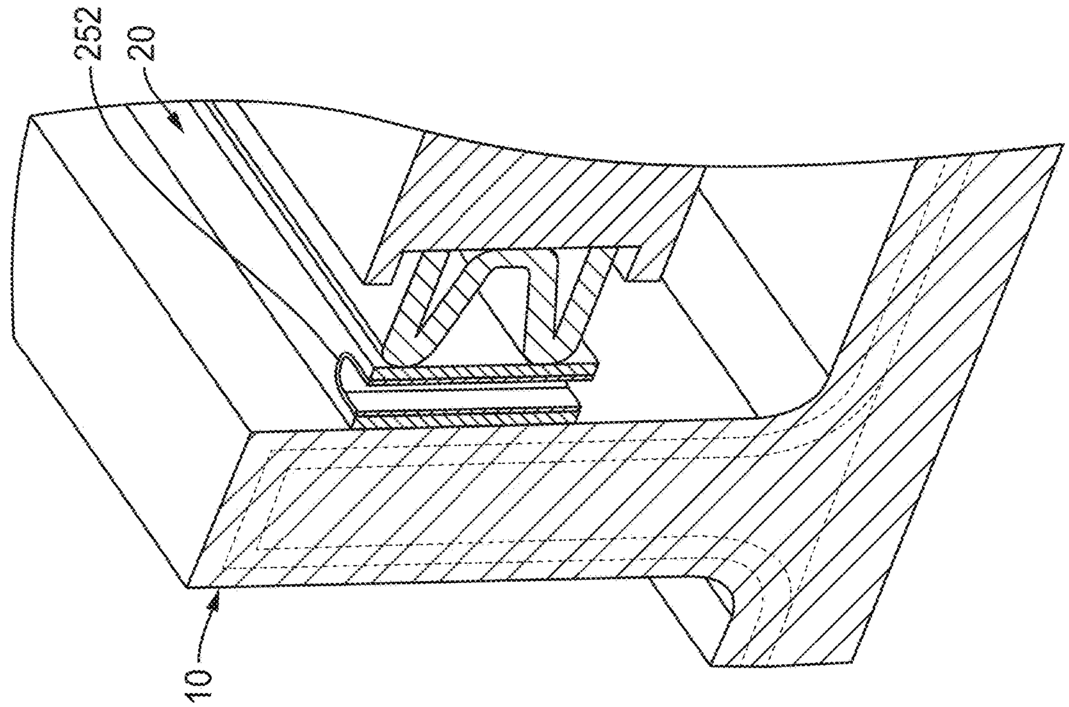
FIGS. 4A and 4B are perspective views of an embodiment having preformed passages through the non-structural plies in accordance with the present disclosure.
Figure 4A:
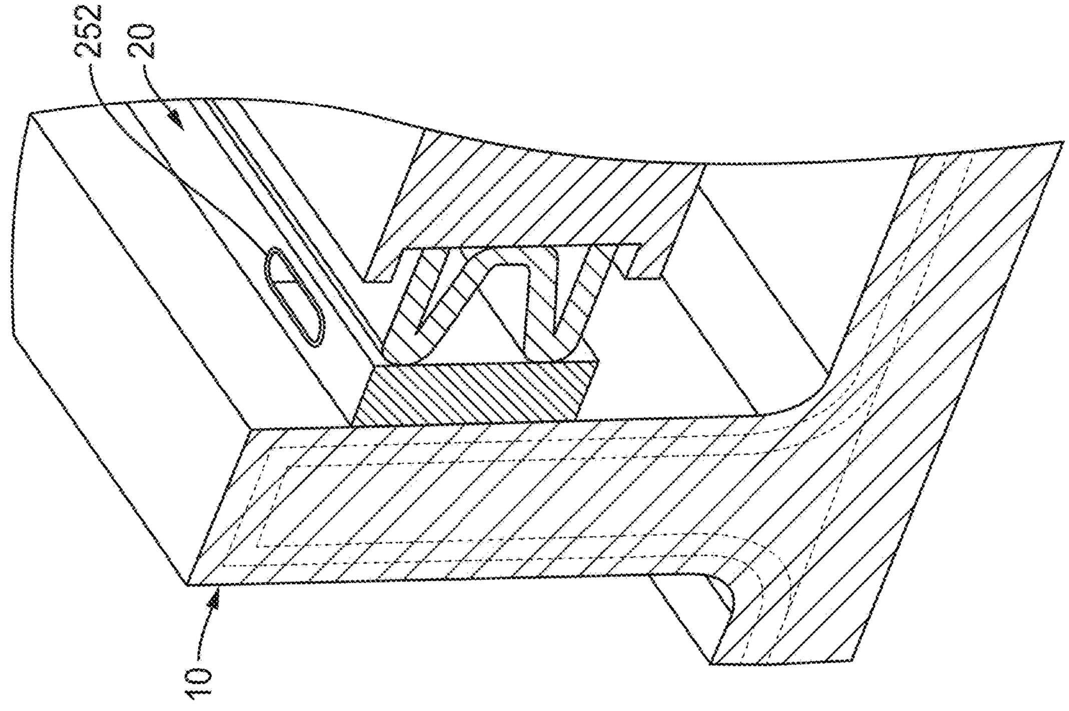

FIGS. 4A and 4B illustrate an embodiment wherein the plurality of non-structural plies 20 have a plurality of racetrack passages 252 preformed into the plurality of non-structural plies 20 prior to densification of the CMC component 10, with the sectional view of FIG. 4B showing the internal surface of the racetrack passage 252 and the ply of fabric used to preform the passage 252.

Figure 5:
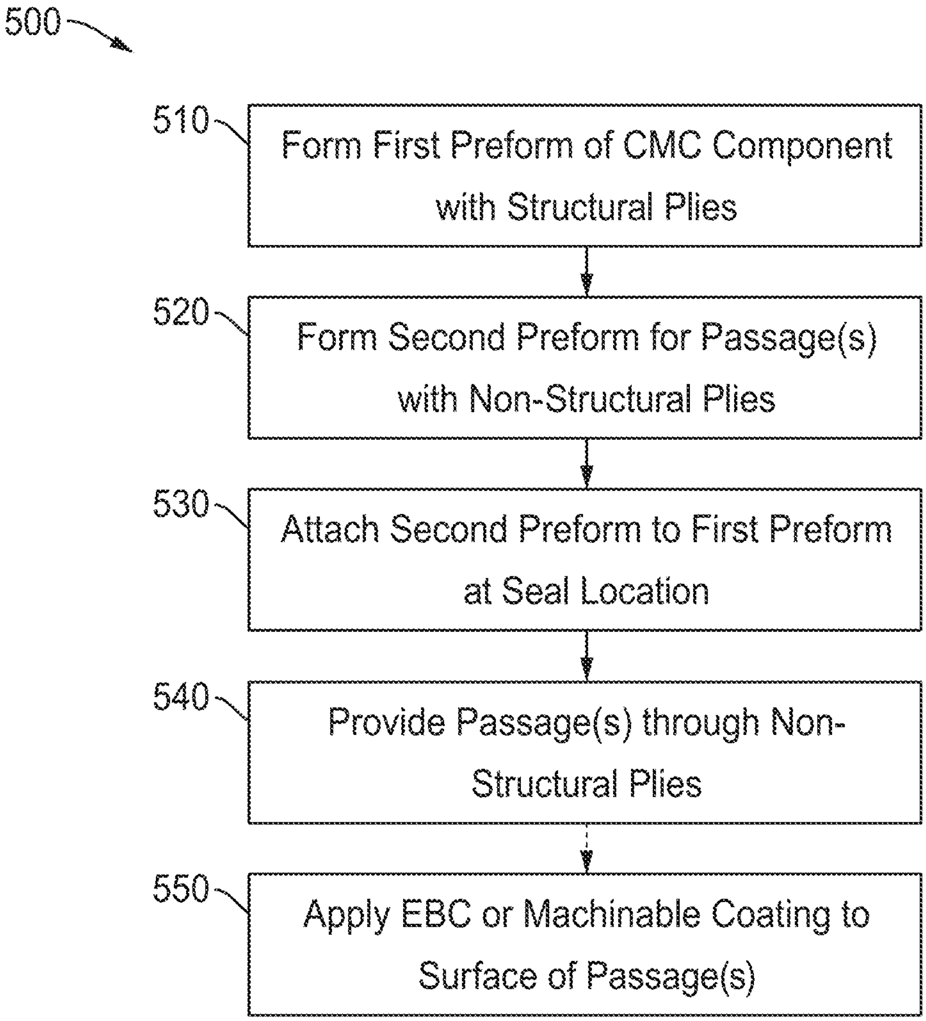
FIG. 5 is a flow diagram of a method for providing at least one passage for cooling air in accordance with the present disclosure.

With reference to FIG. 5, a flow diagram of a method for providing at least one passage for cooling air past a seal for a CMC component is illustrated. After starting, the method 500 includes a first step 510 of forming a first preform of the CMC component 10 with a plurality of structural plies. The method further includes a step 520 that includes forming a second preform for passage(s) with a plurality of non-structural plies 20. The order of steps 510 and 520 may be reversed or both steps may be performed simultaneously.

In a next step 530, the method 500 includes attaching the second preform to the first preform at a predefined location of the seal 30. The first preform may be attached to the second preform in any known manner, pre- or post-densification.

The method 500 further includes a step 540 of providing the at least one passage 25 for cooling air through the plurality of non-structural plies 20. In one embodiment, the step 540 of providing the at least one passage 25 for cooling air through the plurality of non-structural plies 20 includes preforming the at least one passage 25 into the plurality of non-structural plies 20 prior to densification of the CMC component 10 (see, e.g. FIGS. 4A and 4B). In another embodiment, the step 540 of providing the at least one passage 25 for cooling air through the plurality of non-structural plies 20 includes machining the at least one passage 25 into the plurality of non-structural plies 20 after densification of the CMC component (see, e.g. FIGS. 3A and 3B).

In various embodiments, the step 540 of providing the at least one passage 25 for cooling air through the plurality of non-structural plies 20 includes providing a plurality of passages 25, 251, or 252 spaced apart from each other and/or providing a geometry selected from the group consisting of a cylindrical shape, a racetrack shape, a slot shape, a conical shape, and combinations thereof for the passage(s) 25, 251, or 252. For example, a nozzle shaped passage 25 may include a cylindrical portion and a conical portion in series.

Method 500 may further include a step 550 of applying an environmental barrier coating (EBC) or a machinable coating to the at least one passage 25.

Figure 6:
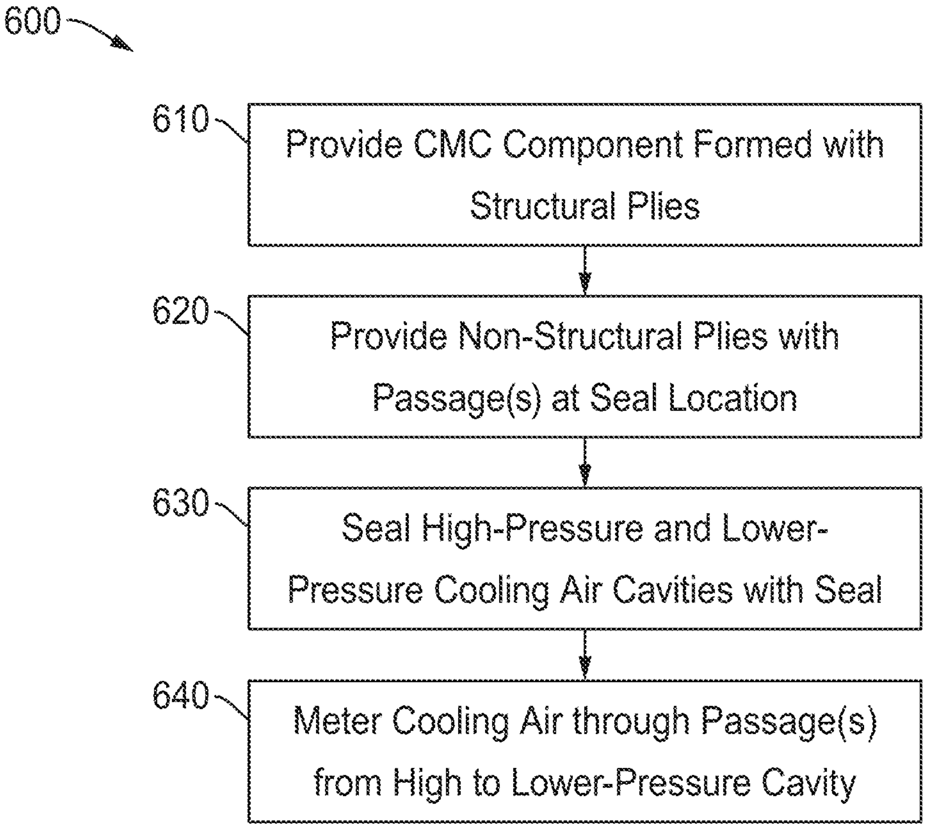
FIG. 6 is a flow diagram of a method for providing cooling air past a seal in accordance with the present disclosure.

With reference to FIG. 2 and FIG. 6, embodiments of the present disclosure further include a method 600 for providing cooling air 45 past a seal 30 to a CMC component 10. After starting, the method 600 includes a first step 610 of providing a CMC component 10 formed of a plurality of structural plies.

A second step 620 includes providing a plurality of non-structural plies 20 to the CMC component 10 at a predefined location of the seal 30, wherein the plurality of non-structural plies 20 includes at least one passage 25 for cooling air 45. In one embodiment, the at least one passage 25 for cooling air 45 is provided through the plurality of non-structural plies 20 by preforming the at least one passage 25 into the plurality of non-structural plies 20 prior to densification of the CMC component 10. In another embodiment, the at least one passage 25 for cooling air 45 is provided through the plurality of non-structural plies 20 by machining the at least one passage 25 into the plurality of non-structural plies 20 after densification of the CMC component 10.

Method 600 continues with a step 630, which involves sealing a high-pressure cooling air cavity 40 from a lower-pressure cooling air cavity 50 by contact of the seal 30 against the plurality of non-structural plies 20. In a final step 640 of method 600, cooling air 45 is metered through the at least one passage 25 from the high-pressure cooling air cavity 40 to the lower-pressure cooling air cavity 50.

In one or more embodiments of method 600, the at least one passage 25 for cooling air 45 may include a plurality of passages 25 spaced apart from each other. For example, for a seal 30 that circumscribes CMC component in a circular manner, a plurality of passages 25 may be equally spaced about the circumference of the seal 30. In another example where more cooling is required on one side of the circumference of seal 30, the passages 25 may be variably spaced, with more passages 25 closer together where additional cooling air 45 is needed.

In various embodiments, the sealing may be provided by a W-seal 30, a feather seal, or the like.

In one or more embodiments, a flow of the cooling air 45 metered through the at least one passage 25 may be smoothed via an environmental barrier coating (EBC) or a machinable coating applied to the at least one passage 25.

The present disclosure permits control of cooling air flow around a seal and between various cavities, as well as metering of the cooling air flow without adversely affecting the structural plies of the various CMC components.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A system for providing cooling air to a ceramic matrix composite (CMC) component, comprising:
- a plurality of structural plies forming a first preform of the CMC component; and
- a plurality of non-structural plies forming a second preform, the second preform attached to the first preform at a predefined seal location, wherein the plurality of non-structural plies includes at least one passage for cooling air.

2. The system of claim 1, wherein the plurality of non-structural plies has the at least one passage preformed into the plurality of non-structural plies prior to densification of the CMC component.

3. The system of claim 1, wherein the plurality of non-structural plies has the at least one passage machined into the plurality of non-structural plies after densification of the CMC component.

4. The system of claim 1, wherein the at least one passage comprises a plurality of passages spaced apart from each other.

5. The system of claim 1, wherein the at least one passage comprises a geometry selected from the group consisting of a cylindrical shape, a racetrack shape, a slot shape, a conical shape, and combinations thereof.

6. The system of claim 1, wherein the at least one passage comprises an environmental barrier coating (EBC) or a machinable coating.

7. The system of claim 1, wherein the at least one passage is configured to meter air flow from a high-pressure cavity to a lower-pressure cavity.

8. A method for providing at least one passage for cooling air past a seal for a ceramic matrix composite (CMC) component, comprising:
- forming a first preform of the CMC component with a plurality of structural plies;
- forming a second preform with a plurality of non-structural plies;
- attaching the second preform to the first preform at a predefined location of the seal; and
- providing the at least one passage for cooling air through the plurality of non-structural plies.

9. The method of claim 8, wherein providing the at least one passage for cooling air through the plurality of non-structural plies includes preforming the at least one passage into the plurality of non-structural plies prior to densification of the CMC component.

10. The method of claim 8, wherein providing the at least one passage for cooling air through the plurality of non-structural plies includes machining the at least one passage into the plurality of non-structural plies after densification of the CMC component.

11. The method of claim 8, wherein providing the at least one passage for cooling air through the plurality of non-structural plies includes providing a plurality of passages spaced apart from each other.

12. The method of claim 8, wherein providing the at least one passage for cooling air through the plurality of non-structural plies includes providing a geometry selected from the group consisting of a cylindrical shape, a racetrack shape, a slot shape, a conical shape, and combinations thereof.

13. The method of claim 8, further comprising applying an environmental barrier coating (EBC) or a machinable coating to the at least one passage.

14. A method for providing cooling air past a seal to a ceramic matrix composite (CMC) component, comprising:
- providing a CMC component formed of a plurality of structural plies;
- providing a plurality of non-structural plies to the CMC component at a predefined location of the seal, wherein the plurality of non-structural plies includes at least one passage for cooling air;
- sealing a high-pressure cooling air cavity from a lower-pressure cooling air cavity by contact of the seal against the plurality of non-structural plies; and
- metering cooling air through the at least one passage from the high-pressure cooling air cavity to the lower-pressure cooling air cavity.

15. The method of claim 14, wherein the at least one passage for cooling air is provided through the plurality of non-structural plies by preforming the at least one passage into the plurality of non-structural plies prior to densification of the CMC component.

16. The method of claim 14, wherein the at least one passage for cooling air is provided through the plurality of non-structural plies by machining the at least one passage into the plurality of non-structural plies after densification of the CMC component.

17. The method of claim 14, wherein the at least one passage for cooling air comprises a plurality of passages spaced apart from each other.

18. The method of claim 14, wherein the sealing is provided by a W-seal.

19. The method of claim 14, wherein the sealing is provided by a feather seal.

20. The method of claim 14, wherein a flow of the cooling air metered through the at least one passage is smoothed via an environmental barrier coating (EBC) or a machinable coating applied to the at least one passage.

* * * * *